US008874161B2

(12) United States Patent
Hwang et al.

(10) Patent No.: US 8,874,161 B2
(45) Date of Patent: Oct. 28, 2014

(54) APPARATUS AND METHOD FOR REDUCING POWER CONSUMPTION IN WIRELESS COMMUNICATION SYSTEM

(75) Inventors: Sang-Yun Hwang, Suwon-si (KR); Jin-Woo Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 13/595,041

(22) Filed: Aug. 27, 2012

(65) Prior Publication Data
US 2013/0053089 A1 Feb. 28, 2013

(30) Foreign Application Priority Data
Aug. 25, 2011 (KR) .................. 10-2011-0085058

(51) Int. Cl.
*H04B 7/00* (2006.01)
*H04W 52/36* (2009.01)
*H04W 52/14* (2009.01)
*H04B 1/04* (2006.01)

(52) U.S. Cl.
CPC .......... *H04W 52/367* (2013.01); *H04W 52/143* (2013.01); *H04B 2001/0416* (2013.01); *Y02B 60/50* (2013.01)
USPC ............. 455/522; 455/68; 455/69; 455/114.3

(58) Field of Classification Search
CPC ........................... H04W 52/367; H04W 52/00
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| 5,831,477 | A | * | 11/1998 | Tsumura .......................... 330/51 |
| 6,069,527 | A | * | 5/2000 | Maruyama ....................... 330/51 |
| 7,797,013 | B2 | * | 9/2010 | Skarby et al. .................. 455/522 |
| 8,095,091 | B1 | * | 1/2012 | Kopikare ..................... 455/127.1 |
| 2004/0053635 | A1 | * | 3/2004 | Haapala et al. ............... 455/522 |
| 2005/0245217 | A1 | * | 11/2005 | Dantoni et al. ............... 455/139 |
| 2007/0024359 | A1 | * | 2/2007 | Yamaji et al. ................... 330/69 |
| 2007/0135071 | A1 | * | 6/2007 | Lee et al. .................... 455/232.1 |
| 2007/0167142 | A1 | * | 7/2007 | Kim et al. ...................... 455/101 |
| 2008/0207143 | A1 | * | 8/2008 | Skarby et al. ................. 455/103 |
| 2008/0231358 | A1 | * | 9/2008 | Maemura .................. 330/124 R |

(Continued)

FOREIGN PATENT DOCUMENTS

WO 2009/140221 A2 11/2009

*Primary Examiner* — Dominic E Rego
(74) *Attorney, Agent, or Firm* — Jefferson IP Law, LLP

(57) ABSTRACT

An apparatus and a method for reducing power consumption in a wireless communication system are provided. The apparatus includes an antenna, a Radio Frequency (RF) module, a first amplifier, an external power amplifier, and a controller. The RF module converts a baseband transmission signal to an RF signal. The first amplifier amplifies power of the RF signal inside the RF module. The external power amplifier amplifies power of an output signal of the first amplifier. When a transmission power level of a transmission signal is equal to or less than a maximum output level of the first amplifier, the controller controls to transmit the transmission signal amplified by the first amplifier via the antenna. When the transmission power level of the transmission signal is equal to or greater than the maximum output level of the first amplifier, the controller controls to transmit a transmission signal amplified by the external power amplifier via the antenna.

20 Claims, 5 Drawing Sheets

(56) References Cited

U.S. PATENT DOCUMENTS

| | | |
|---|---|---|
| 2009/0021374 A1 | 1/2009 | Stagg |
| 2010/0081402 A1 | 4/2010 | Itkin et al. |
| 2011/0095827 A1 | 4/2011 | Tanaka et al. |
| 2011/0286368 A1* | 11/2011 | Kuriyama et al. ............ 370/277 |

* cited by examiner

APPARATUS AND METHOD FOR REDUCING POWER CONSUMPTION IN WIRELESS COMMUNICATION SYSTEM

PRIORITY

This application claims the benefit under 35 U.S.C. §119(a) of a Korean patent application filed on Aug. 25, 2011 in the Korean Intellectual Property Office and assigned Serial No. 10-2011-0085058, the entire disclosure of which is hereby incorporated by reference.

BACKGROUND OF THE INVENTION

1. Field of the Invention

The present invention relates to an apparatus and a method for reducing power consumption in a wireless communication system. More particularly, the present invention relates to an apparatus and a method for reducing power consumption of a mobile station in a wireless communication system.

2. Description of the Related Art

A mobile station of a wireless communication system transmits a signal using a transmitter that includes a baseband module, a Radio Frequency (RF) module, and a Power Amplifier (PA).

The baseband module generates a digital signal to transmit and converts the digital signal to an analog signal.

The RF module converts an analog signal converted by the baseband module to an RF signal.

The PA amplifies power of the RF signal such that the RF signal converted by the RF module may be transmitted to a destination via a radio resource, and transmits the RF signal via an antenna. At this point, the PA should amplify the signal such that the mobile station may transmit the signal to a serving base station at any point of a service area of the serving base station. For example, the mobile station uses a PA that can amplify power up to 30 dBm at the maximum so as to enable communication with a serving base station that is several kilometers or tens of kilometers away. At this point, power consumption of the PA is much greater than that of the baseband module in the mobile station.

A wireless communication system may configure a hetero network that uses a low power small base station in order to raise a network service capacity. For example, the wireless communication system may configure a hetero network in which a macro base station 100 and small base stations 110 and 120 coexist as illustrated in FIG. 1. Here, the small base station includes a pico cell, a femto cell, a relay station, and/or the like.

FIG. 1 illustrates configuration of a hetero network according to the related art.

Referring to FIG. 1, in the hetero network, a pico cell of a pico base station 110 and a femto cell of a femto base station 120 are located inside a macro cell by a macro base station 100.

A mobile station (e.g., MS1 or MS2) located inside the macro cell accesses one of the macro base station 100, the pico base station 110, and the femto base station 120 to receive a communication service.

In a case of receiving a communication service via the hetero network, the mobile station includes a first power amplifier that can support a communication service inside the macro cell whose service area is largest in size among cells configuring the hetero network. In the case in which the mobile station performs communication with the femto base station 120, the mobile station performs communication with the femto base station 120 using the first amplifier.

As described above, in the case in which the mobile station uses the power amplifier that supports communication with the macro base station 100 in order to communicate with the femto base station 120, the mobile station uses the power amplifier whose maximum power level is unnecessarily high, thereby unnecessarily resulting in significant power consumption.

Therefore, a need exists for an apparatus and method for reducing power consumption of a mobile station in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for reducing power consumption of a mobile station in a wireless communication system.

Another aspect of the present invention is to provide an apparatus and a method for reducing power consumption by a power amplifier in a mobile station of a wireless communication system.

Still another aspect of the present invention is to provide an apparatus and a method for reducing power consumption by a power amplifier in a mobile station of a hetero network.

Yet another aspect of the present invention is to provide an apparatus and a method for amplifying transmission power of a transmission signal by controlling a gain of a driving amplifier when a mobile station performs short distance communication.

Further another aspect of the present invention is to provide an apparatus and a method for controlling a gain of a driving amplifier to amplify transmission power of a transmission signal when a mobile station communicates with a small base station.

Further yet another aspect of the present invention is to provide an apparatus and a method for amplifying transmission power of a transmission signal by selectively using a power amplifier and a driving amplifier depending on a transmission power level in a mobile station.

In accordance with an aspect of the present invention, an apparatus for amplifying power of a transmission signal in a mobile station is provided. The apparatus includes an antenna, a Radio Frequency (RF) module for converting a baseband transmission signal to an RF signal, a first amplifier for amplifying power of the RF signal inside the RF module, an external power amplifier for amplifying power of an output signal of the first amplifier, and a controller for, when a transmission power level of the transmission signal is equal to or less than a maximum output level of the first amplifier, controlling to transmit the transmission signal amplified by the first amplifier via the antenna, and for, when the transmission power level of the transmission signal is equal to or greater than the maximum output level of the first amplifier, controlling to transmit the transmission signal amplified by the external power amplifier via the antenna.

In accordance with another aspect of the present invention, a method for amplifying power of a transmission signal in a mobile station is provided. The method includes determining a transmission power level for transmitting a signal, when the transmission power level is equal to or less than a maximum output level of a first amplifier, amplifying power of a transmission signal using the first amplifier, when the transmission power level is greater than the maximum output level of the first amplifier, amplifying the power of the transmission signal using an external power amplifier, and transmitting the transmission signal amplified by at least one of the first amplifier and the external power amplifier via an antenna.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar element, feature, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to an apparatus and a method for reducing power consumption of a mobile station in a wireless communication system that uses a small base station.

Exemplary embodiments of the present invention provide a technology for reducing power consumption by a power amplifier in a mobile station of a wireless communication system.

Figure 1:
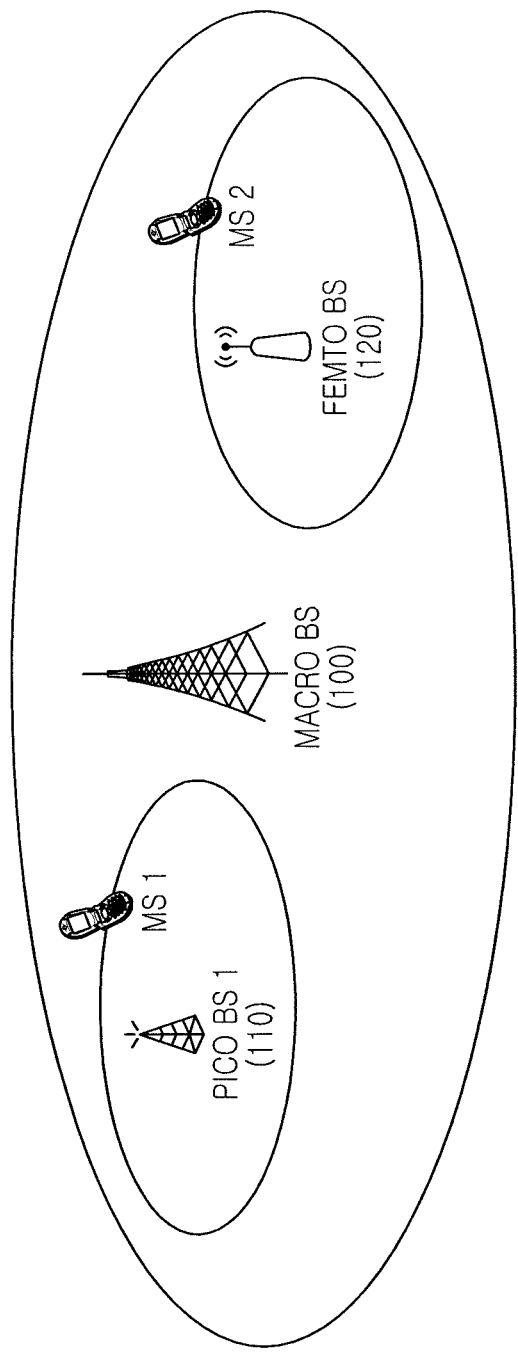
FIG. 1 is a view illustrating configuration of a hetero network according to the related art.
Figure 2:
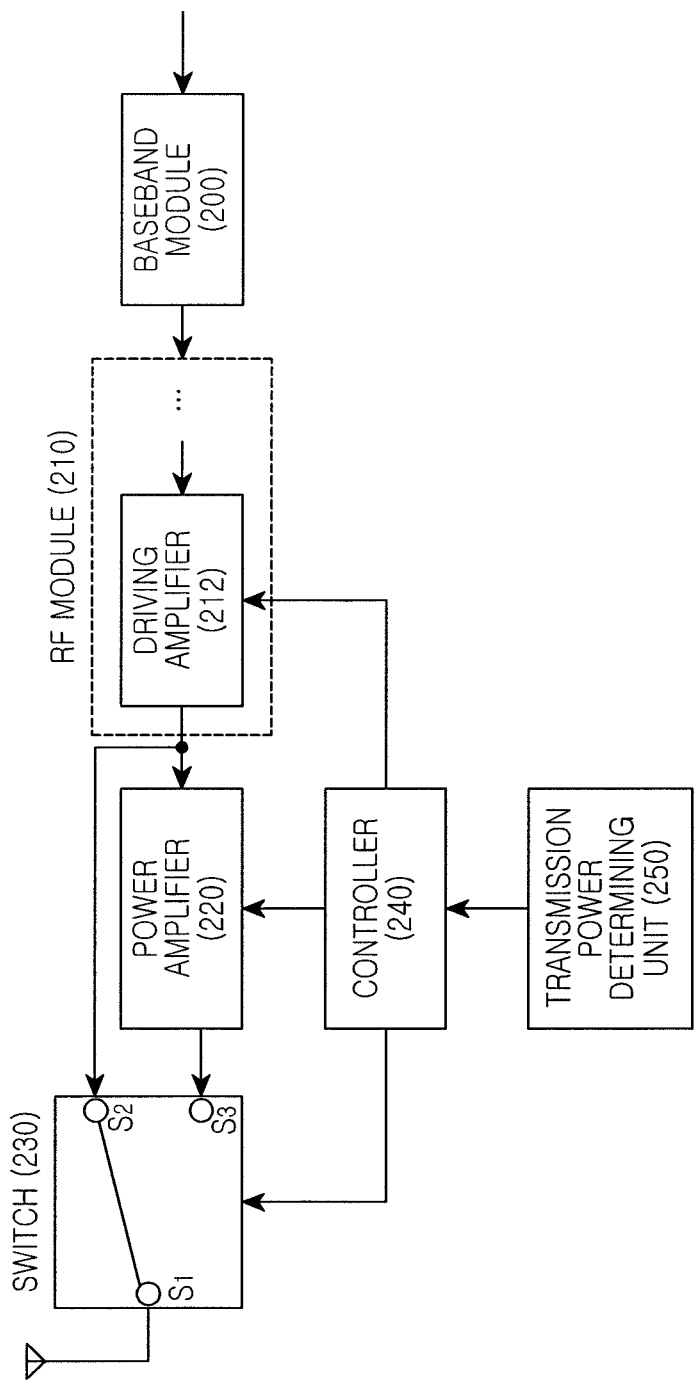
FIG. 2 is a block diagram illustrating a transmitter included in a mobile station according to an exemplary embodiment of the present invention.
Figure 3:
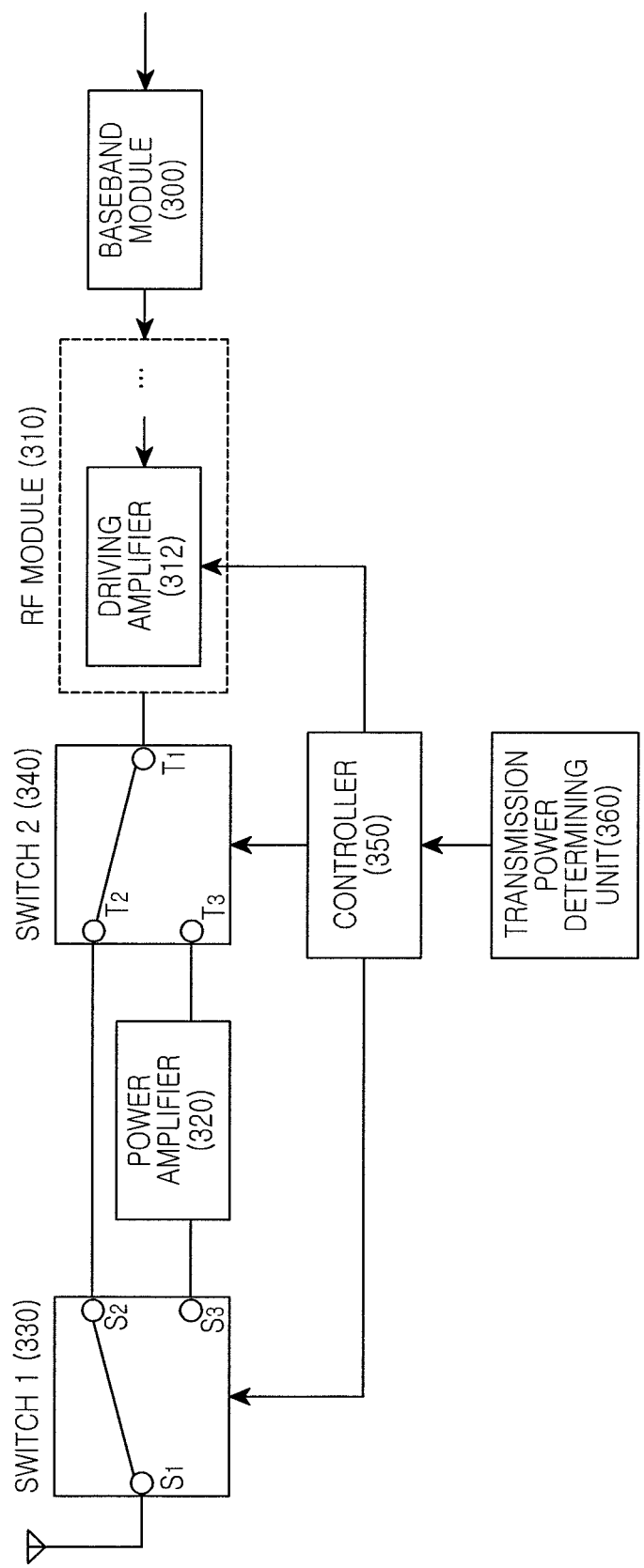
FIG. 3 is a block diagram illustrating a transmitter included in a mobile station according to an exemplary embodiment of the present invention.

According to exemplary embodiments of the present invention, in the wireless communication system, a mobile station includes a transmitter configured as in FIG. 2 or FIG. 3 in order to transmit a signal to a serving base station.

FIG. 2 is a block diagram illustrating a transmitter included in a mobile station according to an exemplary embodiment of the present invention.

Referring to FIG. 2, the transmitter of the mobile station includes a baseband module 200, a Radio Frequency (RF) module 210, a power amplifier 220, a switch 230, a controller 240, and a transmission power determining unit 250.

The baseband module 200 generates a digital signal to transmit, and converts the digital signal to an analog signal. For example, the baseband module 200 may include a channel encode block, a modulation block, a Digital to Analog (D/A) block, and the like. The channel encode block includes a modulator, an interleaver, a channel encoder, and the like. The modulation block includes an Inverse Fast Fourier Transform (IFFT) operator for mapping a signal provided from the channel encode block to each subcarrier. The D/A block converts a signal provided from the modulation block to an analog signal.

The RF module 210 converts an analog signal provided from the baseband module 200 to an RF signal. At this point, the RF module 210 amplifies power of the RF signal using a driving amplifier 212.

Figure 4:
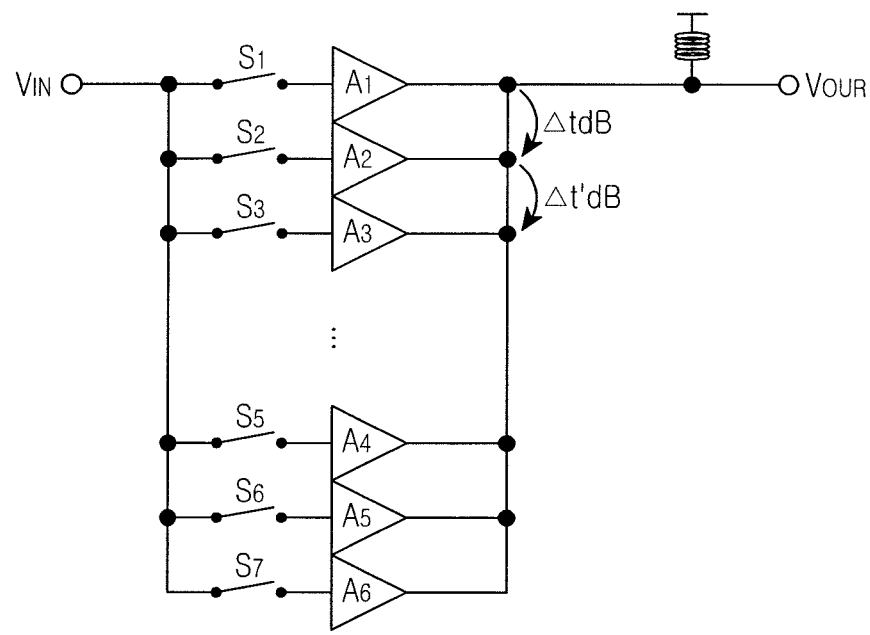
FIG. 4 is a detailed block diagram illustrating a driving amplifier according to an exemplary embodiment of the present invention.

According to exemplary embodiments of the present invention, the driving amplifier 212 amplifies power of an RF signal to a transmission power level depending on a control signal provided from the controller 240. At this point, the driving amplifier 212 may include a plurality of power amplifiers as illustrated in FIG. 4. For example, an output level difference between the power amplifier forming the driving amplifier 212 and a neighbor different power amplifier is the same as a power level change amount Δt dB. The power level change amount denotes an amount of change for controlling transmission power depending on a power level bit which the mobile station receives from a serving base station.

The driving amplifier 212 selects at least one power amplifier among the plurality of power amplifiers (e.g., among the plurality of power amplifiers illustrated in FIG. 4) depending on a transmission power level of the mobile station to amplify power of an RF signal. For example, in the case in which the transmission power level of the mobile station is equal to or less than a maximum output level amplifiable at the driving amplifier 212, the driving amplifier 212 amplifies an RF signal using a power amplifier corresponding to the transmission power level of the mobile station among the plurality of power amplifiers (e.g., among the plurality of power amplifiers illustrated in FIG. 4). As an example, the driving amplifier 212 connects a switch of a power amplifier that can amplify power of the RF signal to the transmission power level of the mobile station with an input end to amplify the RF signal.

For another example, in the case in which the transmission power level of the mobile station is greater than the maximum output level amplifiable at the driving amplifier 212, the driving amplifier 212 amplifies an RF signal using a power amplifier corresponding to an input level of the power amplifier 220 among the plurality of power amplifiers (e.g., among the plurality of power amplifiers illustrated in FIG. 4). For example, the driving amplifier 212 connects a switch of a power amplifier that can amplify power of an RF signal to the input level of the power amplifier 220 with an input end to amplify the RF signal.

The power amplifier 220 amplifies and outputs power of the RF signal so that the RF signal provided from the RF module 210 may be transmitted to a destination via a radio resource. At this point, the power amplifier 220 is turned on/off under control of the controller 240.

The switch 230 connects one of an output of the driving amplifier 212 and an output of the power amplifier 220 with an antenna under control of the controller 240. For example, in the case in which a transmission power level of the mobile station is greater than a maximum output level amplifiable at the driving amplifier 212, the switch 230 connects the antenna with the power amplifier 220. For another example, in the case in which the transmission power level of the mobile station is equal to or less than the maximum output level amplifiable at the driving amplifier 212, the switch 230 connects the antenna with the driving amplifier 212.

The controller 240 controls the driving amplifier 212, the power amplifier 220, and the switch 230 depending on the transmission power level of the mobile station determined by the transmission power determining unit 250. For example, in the case in which the transmission power level of the mobile station is greater than the maximum output level amplifiable at the driving amplifier 212, the controller 240 controls to amplify power of a transmission signal using the power amplifier 220. As an example, the controller 240 transmits transmission power level information to the driving amplifier 212 and controls the switch 230 to connect the antenna with the power amplifier 220. At this point, the controller 240 controls to activate the power amplifier 220.

For another example, in the case in which the transmission power level of the mobile station is equal to or less than the maximum output level amplifiable at the driving amplifier 212, the controller 240 controls to amplify the power of the transmission signal using the driving amplifier 212. For example, the controller 240 transmits transmission power level information to the driving amplifier 212 and controls the switch 230 to connect the antenna with the driving amplifier 212. At this point, the controller 240 controls to inactivate (e.g., deactivate) the power amplifier 220.

The transmission power determining unit 250 determines a transmission power level required for the mobile station to transmit a signal up to a serving base station. For example, the transmission power determining unit 250 changes the transmission power level of the mobile station depending on a rate of change set in advance by a power level bit provided from the serving base station. For another example, the transmission power determining unit 250 may determine the transmission power level of the mobile station with consideration of signal intensity of a reference signal received from the serving base station.

In the above exemplary embodiment of the present invention, the controller 240 transmits the transmission power level information of the mobile station to the driving amplifier 212.

In another exemplary embodiment of the present invention, the controller 240 may transmit a control signal for controlling an output level of the driving amplifier 212 to the driving amplifier 212 depending on the transmission power level of the mobile station.

FIG. 3 is a block diagram illustrating a transmitter included in a mobile station according to an exemplary embodiment of the present invention.

Referring to FIG. 3, the transmitter of the mobile station includes a baseband module 300, an RF module 310, a power amplifier 320, switches 330 and 340 (e.g., switch 1 330, and switch 2 340), a controller 350, and a transmission power determining unit 360.

The baseband module 300 generates a digital signal to transmit, and converts the digital signal to an analog signal. For example, the baseband module 300 may include a channel encode block, a modulation block, a D/A block, and the like. The channel encode block includes a modulator, an interleaver, a channel encoder, and the like. The modulation block includes an Inverse Fast Fourier Transform (IFFT) operator for mapping a signal provided from the channel encode block to each subcarrier. The D/A block converts a signal provided from the modulation block to an analog signal.

The RF module 310 converts an analog signal provided from the baseband module 300 to an RF signal. At this point, the RF module 310 amplifies power of the RF signal using a driving amplifier 312.

The driving amplifier 312 may amplify power of an RF signal to a transmission power level depending on a control signal provided from the controller 350. At this point, the driving amplifier 312 may include a plurality of power amplifiers (e.g., the plurality of power amplifiers as illustrated in FIG. 4). Here, an output level difference between the power amplifier forming the driving amplifier 312 and a neighbor different power amplifier is the same as a power level change amount $\Delta t$ dB. The power level change amount denotes an amount of change for controlling transmission power depending on a power level bit which the mobile station receives from a serving base station.

The driving amplifier 312 selects at least one power amplifier among the plurality of power amplifiers (e.g., the plurality of power amplifiers illustrated in FIG. 4) depending on a transmission power level of the mobile station to amplify power of an RF signal. For example, in the case in which the transmission power level of the mobile station is equal to or less than a maximum output level amplifiable at the driving amplifier 312, the driving amplifier 312 amplifies an RF signal using a power amplifier corresponding to the transmission power level of the mobile station among the plurality of power amplifiers (e.g., the plurality of power amplifiers illustrated in FIG. 4). For example, the driving amplifier 312 connects a switch of a power amplifier that can amplify power of the RF signal to the transmission power level of the mobile station with an input end to amplify the RF signal.

For another example, in the case in which the transmission power level of the mobile station is greater than the maximum output level amplifiable at the driving amplifier 312, the driving amplifier 312 amplifies an RF signal using a power amplifier corresponding to an input level of the power amplifier 320 among the plurality of power amplifiers (e.g., the plurality of power amplifiers illustrated in FIG. 4). As an example, the driving amplifier 312 connects a switch of a power amplifier that can amplify power of the RF signal to the input level of the power amplifier 320 with an input end to amplify the RF signal.

The power amplifier 320 amplifies and outputs power of the RF signal so that the RF signal provided from the RF module 310 may be transmitted to a destination via a radio resource.

The switches 330 and 340 (e.g., switch 1 330, and switch 2 340) connect one of an output of the driving amplifier 312 and an output of the power amplifier 320 with an antenna under control of the controller 350. For example, in the case in which the transmission power level of the mobile station is greater than the maximum output level amplifiable at the driving amplifier 312, the switch 1 330 connects the antenna with the power amplifier 320 (e.g., the switch 1 330 is positioned to connect S1 with S3). For another example, in the case where the transmission power level of the mobile station is equal to or less than the maximum output level amplifiable at the driving amplifier 312, the switch 1 330 connects the antenna with the switch 2 340 (e.g., the switch 1 330 is positioned to connect S1 with S2), and the switch 2 340 connects the switch 1 330 with the RF module 310 (e.g., the switch 2 340 is positioned to connect T1 with T2).

According to exemplary embodiments of the present invention, the controller 350 controls the driving amplifier 312, and the switches 330 and 340 depending on the transmission power level of the mobile station determined by the transmission power determining unit 360. For example, in the case in which the transmission power level of the mobile station is greater than the maximum output level amplifiable at the driving amplifier 312, the controller 350 controls to amplify power of a transmission signal using the power amplifier 320. For example, the controller 350 transmits transmission power level information to the driving amplifier 312. At this point, the controller 350 controls the switch 1 330 to connect the antenna with the power amplifier 320 and controls the switch 2 340 to connect the power amplifier 320 with the RF module 310 (e.g., the switch 2 340 is positioned to connect T1 with T3).

For another example, in the case in which the transmission power level of the mobile station is equal to or less than the maximum output level amplifiable at the driving amplifier 312, the controller 350 controls to amplify power of a transmission signal using the driving amplifier 312. For example, the controller 350 transmits transmission power level information to the driving amplifier 312. At this point, the controller 350 controls the switch 1 330 to connect the antenna with the switch 2 340 and controls the switch 2 340 to connect the switch 1 330 with the RF module 310.

The transmission power determining unit 360 determines a transmission power level required for the mobile station to transmit a signal to a serving base station. For example, according to exemplary embodiments of the present invention, the transmission power determining unit 360 changes the transmission power level of the mobile station depending on a rate of change set in advance by a power level bit provided from the serving base station. As another example, according to exemplary embodiments of the present invention, the transmission power determining unit 360 may determine the transmission power level of the mobile station with consideration of signal intensity of a reference signal received from the serving base station.

In the above exemplary embodiment of the present invention, the controller 350 transmits transmission power level information of the mobile station to the driving amplifier 312.

In another exemplary embodiment of the present invention, the controller 350 may transmit a control signal for controlling an output level of the driving amplifier 312 to the driving amplifier 312 depending on the transmission power level of the mobile station.

FIG. 4 is a detailed block diagram illustrating a driving amplifier according to an exemplary embodiment of the present invention.

Referring to FIG. 4, the driving amplifier (e.g., driving amplifier 212 or driving amplifier 312) may include a plurality of amplifiers A1-A6. Each of the plurality of amplifiers A1-A6 may be selectively operated by respectively controlling switches S1 to S7. For example, according to exemplary embodiments of the present invention, the driving amplifier (e.g., driving amplifier 212 or driving amplifier 312) selects at least one power amplifier among the plurality of power amplifiers depending on a transmission power level of the mobile station to amplify power of an RF signal.

Hereinafter, a method for amplifying a transmission signal at a mobile station is described.

Figure 5:
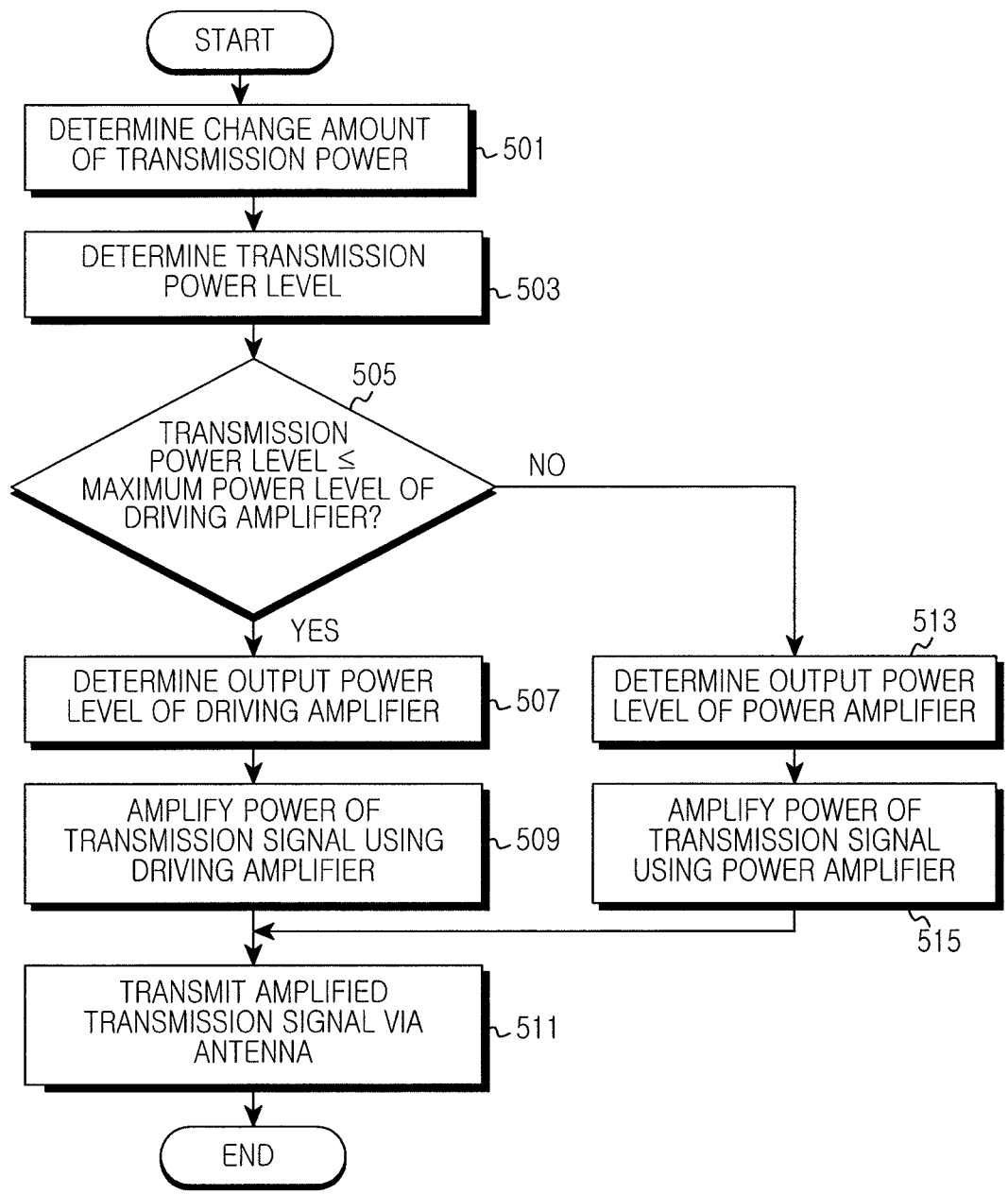
FIG. 5 is a flowchart for amplifying power of a transmission signal in a mobile terminal according to an exemplary embodiment of the present invention.

FIG. 5 is a flowchart for amplifying power of a transmission signal in a mobile terminal according to an exemplary embodiment of the present invention.

Referring to FIG. 5, the mobile station determines a rate of change of transmission power in step 501. For example, the mobile station determines a rate of change of a transmission power of the mobile station depending on an indication of a power level provided from a serving base station. As an example, the indication of the power level may be provided from the serving base station in a power level bit.

After determining the rate of change of the transmission power, the mobile station proceeds to step 503 to determine a transmission power level in order to transmit a signal with consideration of the rate of change of the transmission power. For example, the mobile station changes a transmission power level set in advance depending on the rate of change of the transmission power determined in step 501.

The mobile station then proceeds to step 505 at which a maximum output level of a driving amplifier and the transmission power level are compared. For example, at step 505, the mobile station determines whether the transmission power level is equal to or less than the maximum power level of the driving amplifier.

In the case in which the transmission power level is equal to or less than the maximum output level of the driving amplifier, the mobile station recognizes that it can amplify power of a transmission signal up to the transmission power level using the driving amplifier. Accordingly, the mobile station proceeds to step 507 to determine an output level of the driving amplifier. For example, the driving amplifier includes a plurality of power amplifiers having different output levels (e.g., such as the plurality of power amplifiers illustrated in FIG. 4). Accordingly, the mobile station selects a power amplifier that can amplify power of an RF signal to the transmission power level among the plurality of power amplifiers included in the driving amplifier.

After determining the output level of the driving amplifier, the mobile station proceeds to step 509 to amplify power of the transmission signal using the driving amplifier.

The mobile station then proceeds to step 511 in which the transmission signal whose power has been amplified by the driving amplifier is transmitted to the outside via an antenna. For example, in the case in which the mobile station has been configured as in FIG. 2, the mobile station connects the antenna with the driving amplifier 212 via the switch 230 to transmit the transmission signal whose power has been amplified by the driving amplifier 212 to the outside via the antenna.

In contrast, in the case in which the transmission power level is greater than the maximum output level of the driving amplifier in step 505, the mobile station recognizes that it cannot amplify the power of the transmission signal up to the transmission power level using the driving amplifier. Accordingly, the mobile station proceeds to step 513 to determine an output level of a power amplifier depending on the transmission power level. For example, in the case in which the mobile station is configured as in FIG. 2, the mobile station determines the output level of the power amplifier 220 depending on the transmission power level.

After determining the output level of the power amplifier, the mobile station proceeds to step 515 at which the power of the transmission signal is amplified using the power amplifier. For example, in the case in which the mobile station is configured as in FIG. 2, the mobile station amplifies the RF signal amplified to a predetermined level by the driving amplifier 212 of the RF module 210 to the transmission power level using the power amplifier 220.

The mobile station then proceeds to step 511 in which the transmission signal whose power has been amplified by the power amplifier is transmitted to the outside via an antenna. For example, in the case in which the mobile station is configured as in FIG. 2, the mobile station connects the antenna with the power amplifier 220 via the switch 230 to transmit the transmission signal whose power has been amplified by the power amplifier to the outside via the antenna.

After that, the mobile station ends the present algorithm.

As described above, in the case in which the maximum output level of the driving amplifier is equal to or greater than the transmission power level, the mobile station amplifies the power of a transmission signal using the driving amplifier without using the power amplifier.

A wireless communication system may be configured as a hetero network in which service areas of different sizes overlap. For example, the wireless communication system may be configured as a hetero network in which a macro cell of a macro base station and a small cell of a small base station overlap. For example, the small base station includes a pico cell, a femto cell, and a relay station.

A transmission power level required for a mobile station inside a small cell to transmit a signal up to a small base station in the hetero network is smaller than a transmission power level required for the mobile station to transmit a signal up to a macro base station. Accordingly, in case of transmitting/receiving a signal to/from a serving base station in a short distance area such as a small cell, the mobile station may amplify and transmit a transmission signal using a driving amplifier without using a power amplifier. Meanwhile, in case of transmitting/receiving a signal to/from a serving base station in a long distance area such as a macro cell, the mobile station may amplify and transmit a transmission signal using a power amplifier. At this point, the power amplifier amplifies an RF signal that has been amplified to a predetermined level by the driving amplifier.

As described above, because a mobile station of a wireless communication system amplifies transmission power of a transmission signal by selectively using a power amplifier and a driving amplifier depending on a transmission power level, power consumption of the mobile station may be reduced.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. An apparatus for amplifying power of a transmission signal in a mobile station, the apparatus comprising:
   an antenna;
   a Radio Frequency (RF) module for converting a baseband transmission signal to an RF signal;
   a first amplifier for amplifying power of the RF signal inside the RF module;
   an external power amplifier for amplifying power of an output signal of the first amplifier; and
   a controller for, when a transmission power level of the transmission signal is equal to or less than a maximum output level of the first amplifier, controlling to transmit the transmission signal amplified by the first amplifier via the antenna, and for, when the transmission power level of the transmission signal is equal to or greater than the maximum output level of the first amplifier, controlling to transmit the transmission signal amplified by the external power amplifier via the antenna.

2. The apparatus of claim 1, wherein the first amplifier comprises a plurality of power amplifiers capable of amplifying a signal to different power levels.

3. The apparatus of claim 2, wherein when the transmission power level of the transmission signal is equal to or less than the maximum output level of the first amplifier, the first amplifier amplifies the RF signal using at least one power amplifier corresponding to the transmission power level among the plurality of power amplifiers.

4. The apparatus of claim 2, wherein when the transmission power level of the transmission signal is greater than the maximum output level of the first amplifier, the first amplifier amplifies the RF signal using at least one power amplifier corresponding to an input level of the external power amplifier among the plurality of power amplifiers.

5. The apparatus of claim 2, wherein a difference between output levels of neighboring two power amplifiers among the plurality of power amplifiers is the same as a power level change amount, and
   wherein, the power level change amount represents a change amount for controlling transmission power depending on an indication of a power level provided from a serving base station.

6. The apparatus of claim 5, wherein the indication of the power level provided from the serving base station is included in a power level bit.

7. The apparatus of claim 1, further comprising a transmission power determining unit for determining the transmission power level of the transmission signal.

8. The apparatus of claim 7, wherein the transmission power determining unit determines the transmission power level of the transmission signal with consideration of an indication of a power level provided from a serving base station.

9. The apparatus of claim 1, further comprising a switch for connecting the antenna with the first amplifier under control of the controller when the transmission power level of the transmission signal is equal to or less than the maximum output level of the first amplifier, and for connecting the antenna with the external power amplifier under control of the controller when the transmission power level of the transmission signal is greater than the maximum output level of the first amplifier.

10. The apparatus of claim 1, wherein the external power amplifier is inactivated under control of the controller when the transmission power level of the transmission signal is equal to or less than the maximum output level of the first amplifier.

11. A method for amplifying power of a transmission signal in a mobile station, the method comprising:
   determining a transmission power level for transmitting a signal;
   when the transmission power level is equal to or less than a maximum output level of a first amplifier, amplifying power of a transmission signal using the first amplifier;
   when the transmission power level is greater than the maximum output level of the first amplifier, amplifying the power of the transmission signal using an external power amplifier; and
   transmitting the transmission signal amplified by at least one of the first amplifier and the external power amplifier via an antenna.

12. The method of claim 11, wherein the first amplifier comprises a plurality of power amplifiers capable of amplifying a signal to different power levels.

13. The method of claim 12, wherein a difference between output levels of neighboring two power amplifiers among the plurality of power amplifiers is the same as a power level change amount, and
   wherein the power level change amount represents a change amount for controlling transmission power depending on an indication of a power level provided from a serving base station.

14. The method of claim 11, wherein the amplifying of the power of the transmission signal using the first amplifier comprises:
   selecting at least one power amplifier among a plurality of power amplifiers included in the first amplifier with consideration of the transmission power level; and
   amplifying the power of the transmission signal using the selected at least one power amplifier.

15. The method of claim 11, wherein the amplifying of the power of the transmission signal using the external power amplifier comprises:
   amplifying the power of the transmission signal to an input level of the external power amplifier using the first amplifier; and
   amplifying the power of the transmission signal amplified by the first amplifier using the external power amplifier.

16. The method of claim 15, wherein the amplifying of the power of the transmission signal using the first power amplifier comprises:
   selecting at least one power amplifier among a plurality of power amplifiers included in the first amplifier with consideration of the input level of the external power amplifier; and
   amplifying the power of the transmission signal using the selected at least one power amplifier.

17. The method of claim 11, wherein the transmitting of the transmission signal via the antenna comprises:
   when the transmission power level is equal to or less than the maximum output level of the first amplifier, connecting the antenna with the first amplifier using at least one switch; and
   transmitting the transmission signal whose power has been amplified by the first amplifier via the antenna.

18. The method of claim 11, wherein the transmitting of the transmission signal via the antenna comprises:
   when the transmission power level is greater than the maximum output level of the first amplifier, connecting the antenna with the external power amplifier using at least one switch; and
   transmitting the transmission signal whose power has been amplified by the external power amplifier via the antenna.

19. The method of claim 11, further comprising:
   when amplifying the power of the transmission signal using the first amplifier, inactivating the external power amplifier.

20. The method of claim 11, wherein the determining of the transmission power level comprises determining the transmission power level of the transmission signal with consideration of an indication of a power level provided from a serving base station.

* * * * *